Patented Dec. 16, 1930

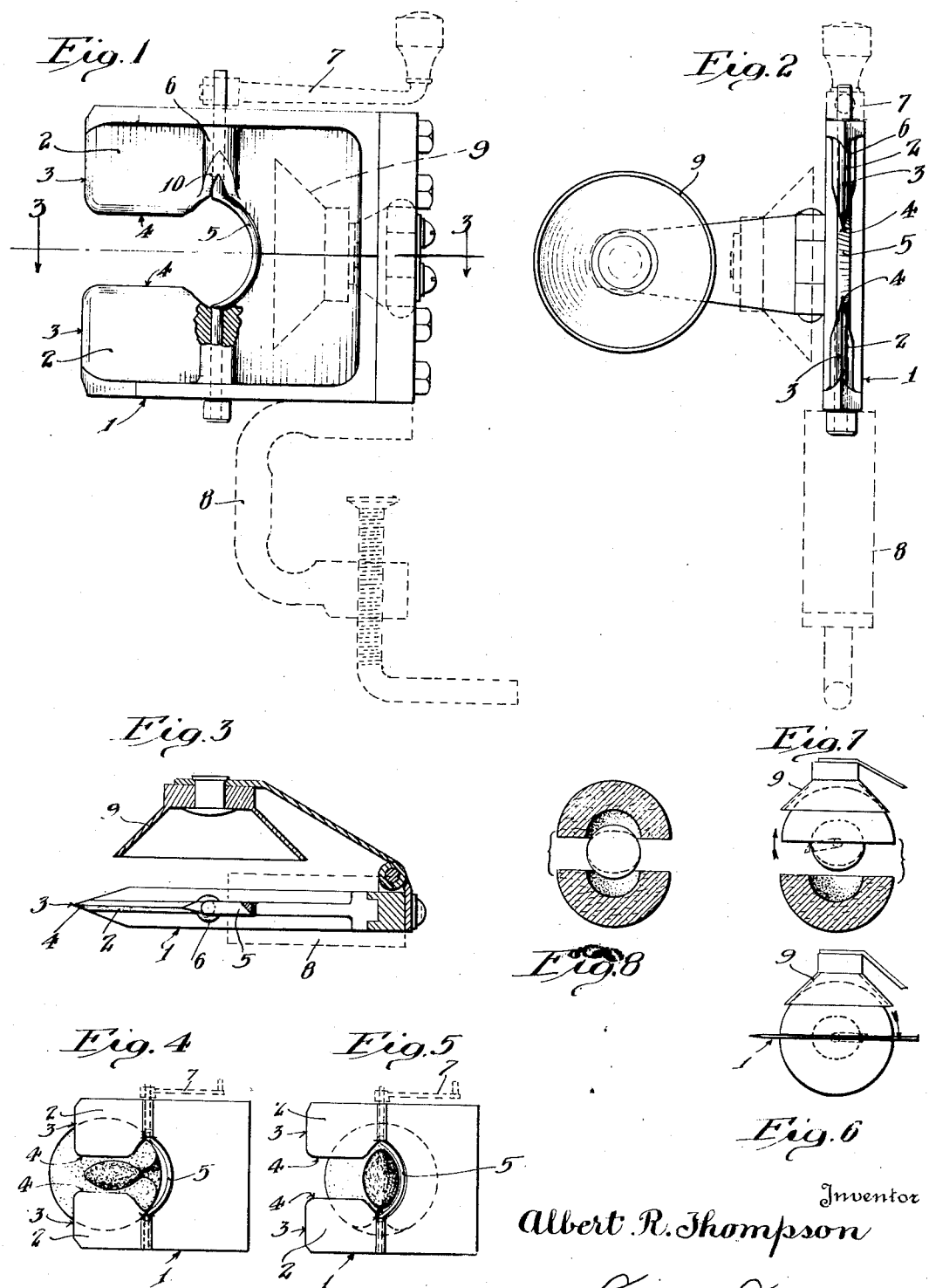

1,785,015

UNITED STATES PATENT OFFICE

ALBERT R. THOMPSON, OF SAN JOSE, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT PITTER

Application filed October 14, 1925. Serial No. 62,377.

This invention relates to a fruit pitter adapted to remove pits or stones from fruit such as clingstone peaches or the like.

The primary object of this invention is to provide a fruit pitter adapted to remove the pits or stones from the fruit efficiently and economically. It is desired that the pitter should remove the stone or pit from the fruit with a minimum loss of flesh of the fruit, and by producing a uniform cut in the flesh of the fruit. Heretofore this has been attempted in pitting devices by either having the fruit cut through the pit prior to severing the pit from the fruit, or by removing an annular slice of the flesh of the fruit to gain access to the pit. The present invention contemplates cleaving the flesh of the fruit without removing a slice, expanding the cleft in the flesh of the fruit, and operating the cleft to sever the pit intact from the flesh of the fruit.

The invention is preferably embodied in a unit or device providing a slotted blade upon which the fruit may be impaled with the intact pit positioned in the slot to engage a revolvable pitting knife mounted at the back of the slot with the axis of the pitting knife normal to the axis of the slot and in the plane of the blade.

A preferred embodiment of the invention is illustrated by way of example in the accompanying drawings in which:

Fig. 1 is a side elevation of the pitter unit.

Fig. 2 is a front elevation of the unit illustrated in Fig. 1.

Fig. 3 is a section taken on a line 3—3 in Fig. 1.

Fig. 4 is a diagrammatic illustration showing the progress of the fruit as the same is impaled on the blade of the unit with the pit or stone entering the slot between the bifurcations of the blade.

Fig. 5 corresponds to Fig. 4 and shows the fruit impaled upon the blade of the unit with the pit or stone positioned adjacent the pitting knife immediately prior to the severing of the pit or stone from the flesh of the fruit.

Fig. 6 is a diagrammatic view looking down upon the fruit as impaled on the blade prior to the severing of the pit, and also showing means that may be employed if desired to maintain the fruit upon the blade while the last half of the flesh of the fruit is being severed from the pit.

Fig. 7 is a diagrammatic view corresponding to Fig. 6, illustrating the severing of the first half of the fruit.

Fig. 8 is a diagrammatic view illustrating the fruit as pitted.

In the drawings, 1 indicates a slotted impaling blade providing bifurcations 2. Each bifurcation 2 is sharpened to provide knife edges 3 and 4. A revolvable pitting knife 5 is mounted at the back of the slot of the impaling blade 1. Opposite ends of the knife 5 are journaled in bearings 6 formed on the bifurcations 2. The bearings 6 provide an expansion of the blade 1 at the end of the slot in which the pitting knife 5 is mounted.

The unit above described is adapted for embodiment as a single pitting device, or a plurality of such units may be incorporated in a pitting machine within the contemplation of the present invention. The pitting knife 5 may be turned by any desired means, for example by a crank 7. The unit may be mounted upon a support as desired, for example by the conventional clamp 8. Means may be provided for maintaining the fruit upon the impaling blade 1 after the flesh of the first half of the fruit has been severed from the pit, for example by a hinged cup 9.

In operation the fruit may be impaled upon the blade 1, as illustrated in Fig. 4, by forcing the stem end of the fruit against the front knife edges 3 of the bifurcations 2, so that the pit or stone is received within the slot of the blade 1. The fruit should be forced upon the blade 1 until the pit or stone contacts with the pitting blade 5, and should then be turned through an arc of 90 degrees to complete the annular cleft in the flesh of the fruit. The bearings 6 for the knife 5 should be chamfered as at 10 to a thickness corresponding to the width of the pitting knife 5, and function to expand the cleft produced in the flesh of the fruit by the bifurcations 2 of the blade 1 sufficiently to permit the pitting knife 5 to pass through the cleft and contact with the stone or pit. As the pitting knife 5 is mounted at the back of the slot of the blade 1 with the axis of the pitting knife normal to the axis of the slot and in the plane of the blade, the fruit may be impaled upon the blade 1 as above described, until the pit or stone of the fruit contacts with the knife 5, thereby assuredly determining that the pit or stone is in the proper position for the action of the pitting knife. The pitting knife 5 is then turned and severs the first half of the flesh of the fruit from the pit, and the continued revolution of the pitting knife 5 then severs the second half of the flesh of the fruit from the pit. During the severing of the second half of the flesh of the fruit from the pit, the same should be maintained manually or mechanically positioned on the impaling blade 1, and the cup 9 may be employed for that purpose, as illustrated in Fig. 7. Upon the completion of the revolution of the pitting knife 5 the pit or stone has been severed from the halved flesh of the fruit, as illustrated in Fig. 8. The halved sections of the flesh of the fruit and the pit may be held during the pitting operation and after as desired, or may be allowed to fall from the blade as the pitting progresses. The width of the slot in the blade 1 may be restricted to the narrow diameter of the pit to provide additional support for the flesh of the fruit during the revolution of the pitting knife 5.

In operation the present invention serves to halve the flesh of the fruit and sever the pit without removing any of the flesh of the fruit, excepting that immediately adhering to the pit. By aligning the natural seam of the fruit at the stem end with the front edges of the bifurcations 2 and forcing the fruit upon the impaler blade until the pit or stone contacts in position with the pitting knife 5, the pitting operation is centered by the pit or stone, and not merely by the exterior appearance of the fruit. This avoids the difficulty experienced with prior machines in which the pitting operation is centered by the exterior appearance of the fruit that arises because of the pit occupying varying and uncertain positions in the fruit.

The pitting knife 5 may be made of a radius corresponding to the depth of cut desired in the flesh of the fruit, and a uniform cut is assured. The invention may be adapted to fruit having pits or stones of varying sizes and shapes by selecting the proper contour for the pitting knife 5.

The embodiment of the invention herein described is adapted particularly for clingstone fruit wherein the stone must be severed from the fruit. The pitting knife may be omitted and the impaling blade embodying the invention serve as a highly efficient device for pitting freestone fruit.

The invention is not limited to the embodiment above set forth for purposes of illustration, for the invention is susceptible of varying embodiments and of the full scope defined in the following claims.

What I claim is:

1. In a fruit pitter, impaling means for cleaving the flesh of the fruit and leaving the pit intact, pitting means on said impaling means and adapted to pass around the intact pit and sever the same from the flesh of the fruit, and means for maintaining the second half of the fruit on the blade after the first half of the fruit has been severed from the pit.

2. In a fruit pitter, impaling means for severing the flesh of the fruit to the intact pit, pitting means supported by the impaling means, means adapted to engage the exterior of the fruit for maintaining the fruit on the impaling means during the operation of the pitting means, and means for actuating the pitting means to pass the same around the intact pit and sever the fruit from the pit.

3. In a fruit pitter, impaling means for severing the flesh of the fruit and leaving the pit intact, means for supporting the fruit on the impaling means from the exterior of the fruit, pitting means supported by the impaling blade and adapted to pass around the intact pit and sever the same from the flesh of the fruit.

Signed at Los Angeles, Calif., this 8th day of October, 1925.

ALBERT R. THOMPSON.